(12) United States Patent
Pan

(10) Patent No.: US 8,587,367 B1
(45) Date of Patent: Nov. 19, 2013

(54) VOLTAGE PUMPING CIRCUIT

(75) Inventor: Dong Pan, Boise, ID (US)

(73) Assignee: Nanya Technology Corp., Kueishan, Tao-Yuan Hsien (TW)

( * ) Notice: Subject to any disclaimer, the term of this patent is extended or adjusted under 35 U.S.C. 154(b) by 0 days.

(21) Appl. No.: 13/490,431

(22) Filed: Jun. 6, 2012

(51) Int. Cl.
*G05F 1/10* (2006.01)

(52) U.S. Cl.
USPC .......................................... 327/536

(58) Field of Classification Search
USPC ......... 327/536, 530, 534, 535, 537, 538, 540, 327/541, 543
See application file for complete search history.

(56) References Cited

U.S. PATENT DOCUMENTS

| | | | | |
|---|---|---|---|---|
| 5,999,040 A * | 12/1999 | Do et al. | ......... | 327/536 |
| 6,791,212 B2 * | 9/2004 | Pulvirenti et al. | ......... | 307/113 |
| 7,889,523 B2 * | 2/2011 | Cook et al. | ......... | 363/59 |
| 8,384,467 B1 * | 2/2013 | O'Keeffe et al. | ......... | 327/536 |
| 2001/0020864 A1 * | 9/2001 | Myono | ......... | 327/536 |
| 2002/0130701 A1 * | 9/2002 | Kleveland | ......... | 327/536 |
| 2004/0046603 A1 * | 3/2004 | Bedarida et al. | ......... | 327/536 |
| 2006/0186947 A1 * | 8/2006 | Lin et al. | ......... | 327/536 |
| 2010/0033232 A1 * | 2/2010 | Pan | ......... | 327/536 |

* cited by examiner

*Primary Examiner* — Lincoln Donovan
*Assistant Examiner* — Jung H Kim
(74) *Attorney, Agent, or Firm* — Winston Hsu; Scott Margo

(57) ABSTRACT

A voltage pumping circuit for pumping an input voltage to generate an output voltage, which comprises: a first voltage pumping path including a first number of pumping stages; and a second voltage pumping path including a second number of pumping stages, wherein the second number is less than the first number. Only one of the first voltage pumping path and the second voltage pumping path is activated according to at least one path selecting signal to pump the input voltage to generate the output voltage.

4 Claims, 5 Drawing Sheets

VOLTAGE PUMPING CIRCUIT

BACKGROUND OF THE INVENTION

1. Field of the Invention

The present invention relates to a voltage pumping circuit, and particularly relates to a voltage pumping circuit having voltage pumping paths with different numbers of pumping stages.

2. Description of the Prior Art

Power/Current used generating pumped supplies are the major components of IDD indicating the current one circuit/part consumes. Current efficiency for the pump supplies is very dependent on the number of pumping stages. In order to get higher current efficiency, less number of stages is preferred for pump cores. However, the less number of pumping stages, the lower max output voltage.

Therefore, it is a trade off between current efficiency and output voltage, which is hard to design, if the number of the pumping stages that a voltage pumping circuit can use is fixed.

SUMMARY OF THE INVENTION

Therefore, one embodiment of the present invention is to provide a voltage pumping circuit including more than one voltage pumping paths.

One embodiment of the present invention discloses a voltage pumping circuit for pumping an input voltage to generate an output voltage, which comprises: a first voltage pumping path including a first number of pumping stages; and a second voltage pumping path including a second number of pumping stages, wherein the second number is less than the first number. Only one of the first voltage pumping path and the second voltage pumping path is activated according to at least one path selecting signal to pump the input voltage to generate the output voltage.

The voltage pumping circuit according to the embodiment of the present invention can further comprise: an output voltage detecting circuit, for generating a detecting signal according to the output voltage and a first reference voltage such that the output voltage can be adjusted to a desired value, wherein the output voltage detecting circuit utilizes a first trim parameter to adjust the output voltage back to the desired value if the first reference voltage varies; and a path selecting circuit, for comparing a division voltage generated from the input voltage and a second reference voltage to generate the path selecting signal, wherein the output voltage detecting circuit utilizes a second trim parameter to generate the division voltage; wherein the first trim parameter and the second trim parameter have the same values.

In view of above-mentioned embodiments, pumping stages can be selected corresponding to different requirements. Besides, an accurate path selecting circuit varies trim parameter thereof corresponding to the trim parameter of the output voltage detecting circuit is also provided.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, electronic equipment manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
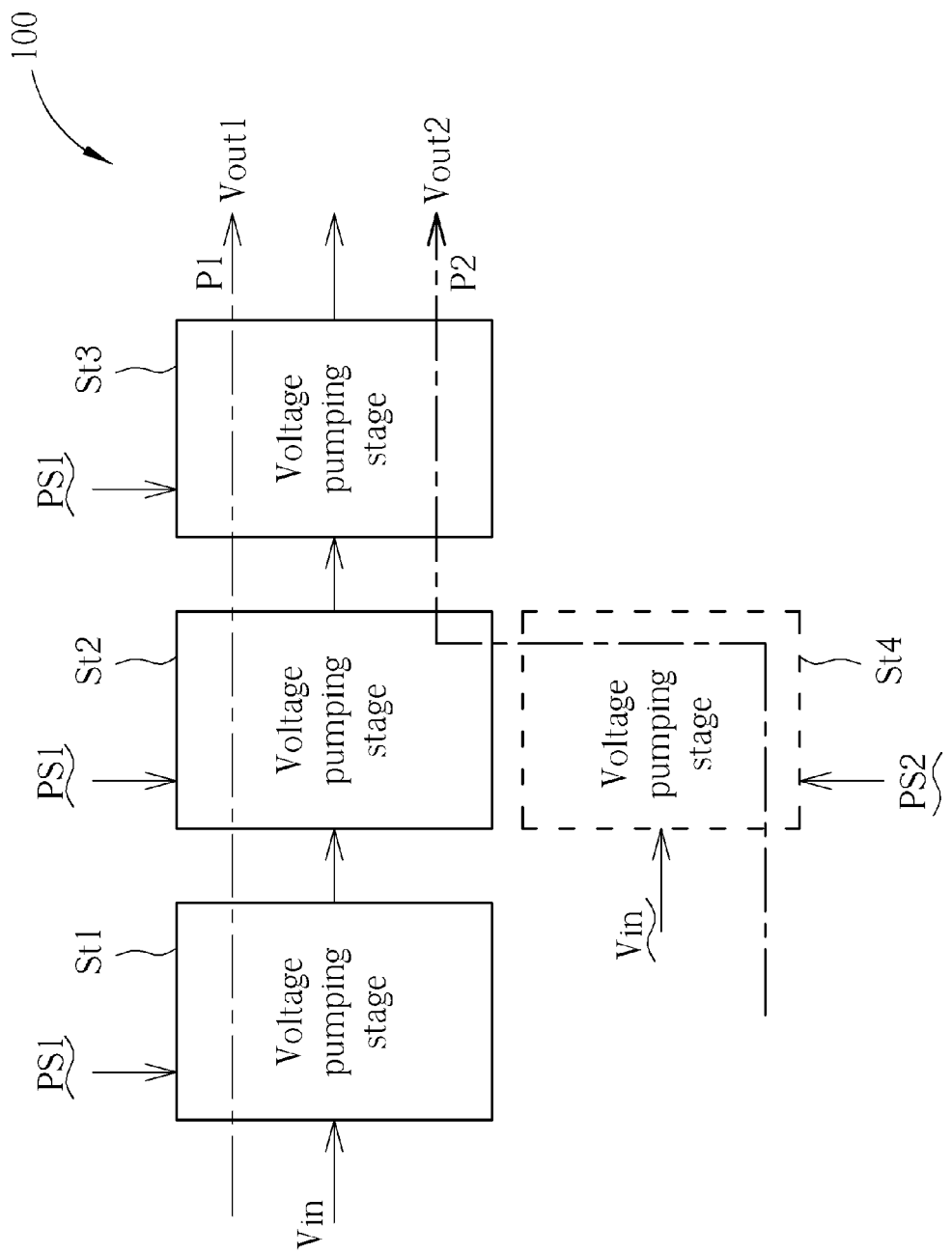
FIG. 1 is a block diagram illustrating a voltage pumping circuit according to an embodiment of the present invention.

FIG. 1 is a block diagram illustrating a voltage pumping circuit 100 according to an embodiment of the present invention. AS shown in FIG. 1, the voltage pumping circuit 100 includes a first pumping path P1 and a second pumping path P2. The first pumping path P1 and the second pumping path P2 have different numbers of pumping stages. Only one of the first voltage pumping path P1 and the second voltage pumping path P2 is activated according to at least one path selecting signal PS1, PS2 to pump the input voltage Vin to respectively generate the output voltages Vout1 or Vout2. As above-mentioned, the higher current efficiency, less number of pumping stages is preferred for pump cores. However, the less number of pumping stages, the lower max output voltage. Therefore, the voltage pumping path of the voltage pumping circuit 100 can be well selected depending on the requirement, since the voltage pumping circuit 100 includes more than one voltage pumping paths.

In this embodiment, the voltage pumping circuit 100 includes pumping stages st1, st2, st3 and st4. The pumping stages st1, st2, and st3 sequentially form the first pumping path P1, and the pumping stages st4, st3 sequentially form the second pumping path P2. However, please note the number of pumping stages each voltage pumping path includes and the number of voltage pumping paths shown in FIG. 1 are only for example to explain the concept of the present invention, but it does not mean to limit the scope of the present invention. Additionally, in this embodiment, the pumping stage st2 and the pumping stage st4 share at least one device in the pumping stage st2. However, the two voltage pumping paths can also be independent from each other.

Besides, all the voltage pumping stages receive the path selecting signals PS1, PS2 to determine which voltage pumping stage is used. However, other mechanism for selecting the voltage pumping path can be applied to the present invention. For example, a control circuit independent from the pumping stages can be provided to control the selecting operation.

Figure 2A:
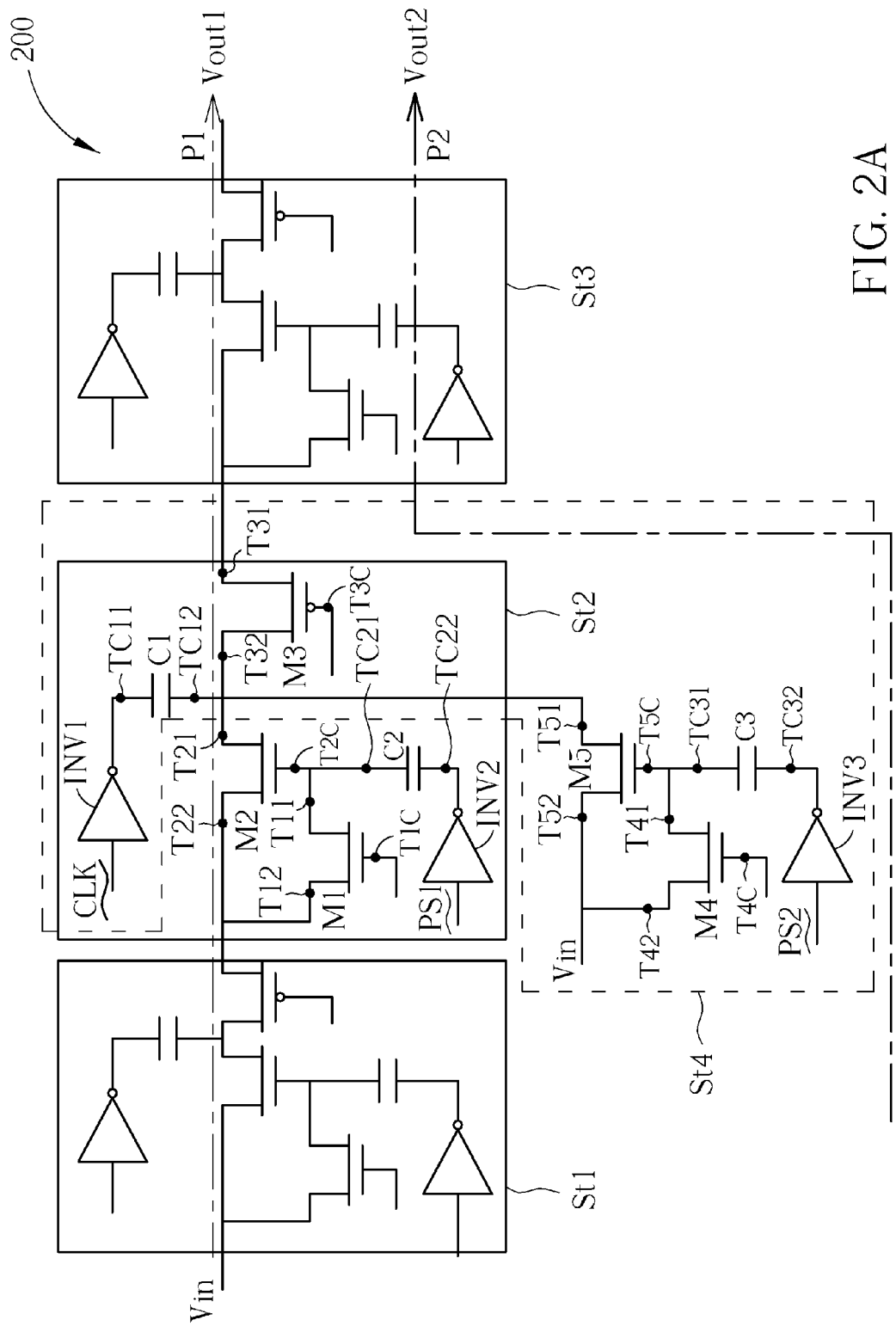
FIG. 2A is a circuit diagram illustrating an exemplary circuit structure for the embodiment of FIG. 1.

FIG. 2A is a circuit diagram illustrating an exemplary circuit structure for the embodiment of FIG. 1. The pumping stage St2 is utilized to explain the circuit structure but the depicted circuit structure can be applied to other pumping stages. As shown in FIG. 2A, the pumping stage St2 comprises: a first switch M1, a second switch M2, a third switch M3, a first capacitor C1, a second capacitor C2, a first inverter INV1, and a second inverter INV2. The first switch M1 has a first terminal T11, a second terminal T12, and a control terminal T1C. The second terminal T12 receives the input voltage Vin or output from a previous pumping stage, depending on if it is a first pumping stage. The second switch M2 has a first terminal T21, a second terminal T22 and a control terminal T2C. The second terminal T22 is coupled to the second terminal T12 of the first switch M1. The third switch M3 includes a first terminal T31, a second terminal T32 and a control terminal T3C. The first terminal T31 outputs the output voltage Vout or outputs to the next pumping stage, depending on if it is a final pumping stage. The second terminal T32 is coupled to the first terminal T21 of the second switch M2.

The first capacitor C1 has a first terminal TC11, and a second terminal TC12. The second terminal TC12 is coupled to the first terminal T21 of the second switch M2. The second capacitor C2 also has a first terminal TC21 and a second terminal TC22. The first terminal TC21 is coupled to the control terminal T2C of the second switch M2. The first inverter INV1 has an output terminal coupled to the first terminal TC11 of the first capacitor C1. In this embodiment, the first inverter INV1 receives a clock signal CLK. The second inverter INV2 receives the path selecting signal PS, and has an output terminal coupled to the second terminal TC22 of the second capacitor C2.

The pumping stage St4 includes a fourth switch M4, a fifth switch M5, a third capacitor C3, and a third inverter INV3. The pumping stage St4 also includes the third switch M3 and the first inverter INV1, that is, the pumping stages St2 and St4 share the third switch M3 and the first inverter INV1. The fourth switch M4 has a first terminal T41, a second terminal T42 receiving the input voltage Vin and a control terminal T4C. The fifth switch M5 has a first terminal T51, a second terminal T52 and a control terminal T5C. The first terminal T51 is coupled to the second terminal T32 of the third switch M3. The control terminal T5C is coupled to the first terminal T41 of the fourth switch M4. The second terminal T52 is coupled to the second terminal T42 of the fourth switch M4. The third capacitor C3 has a first terminal TC31 and a second terminal TC32. The first terminal TC31 is coupled to the control terminal T5C of the fifth switch M5. The third inverter INV3 receives the path selecting signal PS2, which is different from the path selecting signal PS1 and has an output terminal coupled to the second terminal TC32 of the third capacitor C3.

The operation of the pumping stage St2 can operate in two modes, depending on the logic values of the clock signal CLK and the path selecting signal PS1. In the first mode (also called pre-charge mode), CLK=1, and the output terminal of the first inverter INV1 is 0. The path selecting signal PS1 is low and the control terminal T2C is high, such that the switch M2 is enabled. The capacitor C1 is charged thus the voltage at the first terminal T21 is charged to high. In this case, the control terminal T3C of the third switch M3 receives high and the third switch M3 is disabled.

In the second mode, CLK=0 and the output value of the first inverter INV1 is 1, the path selecting signal PS1 is 0, and the control terminal T1C of the first switch M1 receives high. By this way, the first switch M2 is enabled and the control terminal T2C low, such that the second switch M2 is disabled. Simultaneously, the output value of the first inverter INV1 is 0 and the voltage at the first terminal T21 is charged to high, and the third switch M3 receives low and the third switch M3 is enabled. By this way, the charge is transferred to the next stage.

Please note that in the pre charge mode, the first switch M1, the second switch M2, the second capacitor C2, and the second inverter INV2 are utilized to pre-charge. Following the same rules, the fourth switch M4, the fifth switch M5, the third capacitor C3, and the third inverter INV3 in the pumping stage St4 are also utilized to pre-charge, therefore the fourth switch M4, the fifth switch M5, the third capacitor C3, and the third inverter INV3 can be regarded as a pre-charge circuit. Accordingly, the voltage pumping circuit 200 in FIG. 2A can be regarded as comprising three pumping stages St1, St2, St3 and a pre-charge circuit comprising M4, M5, C3, INV3. By this way, the second voltage pumping path P2 can be regarded as comprising: a pre-charge circuit, parts of the pumping stage St2, and the pumping stage St3.

The pumping stage St4 has the same structure as which of the pumping stage St2, thus has similar operation. Based on above-mentioned teachings of the present invention, persons skilled in the art will under stand how to design signals inputted to the pumping stages St1-St4 such that either the first pumping path P1 or the second pumping path P2 can operate well, thus other details are omitted for brevity here.

The above-mentioned concept discloses multiple voltage pumping paths. However, how to select a suitable voltage pumping path is also a key point to concern. One method is utilizing a path selecting circuit to select the voltage pumping path depending on the input voltage Vin. However, the detecting of the input voltage Vin may be varied, since reference voltage utilized to compare with the voltage Vin maybe have variation and the target of the output voltage Vout may changes. Therefore, a precise path selecting circuit is needed.

Figure 2B:
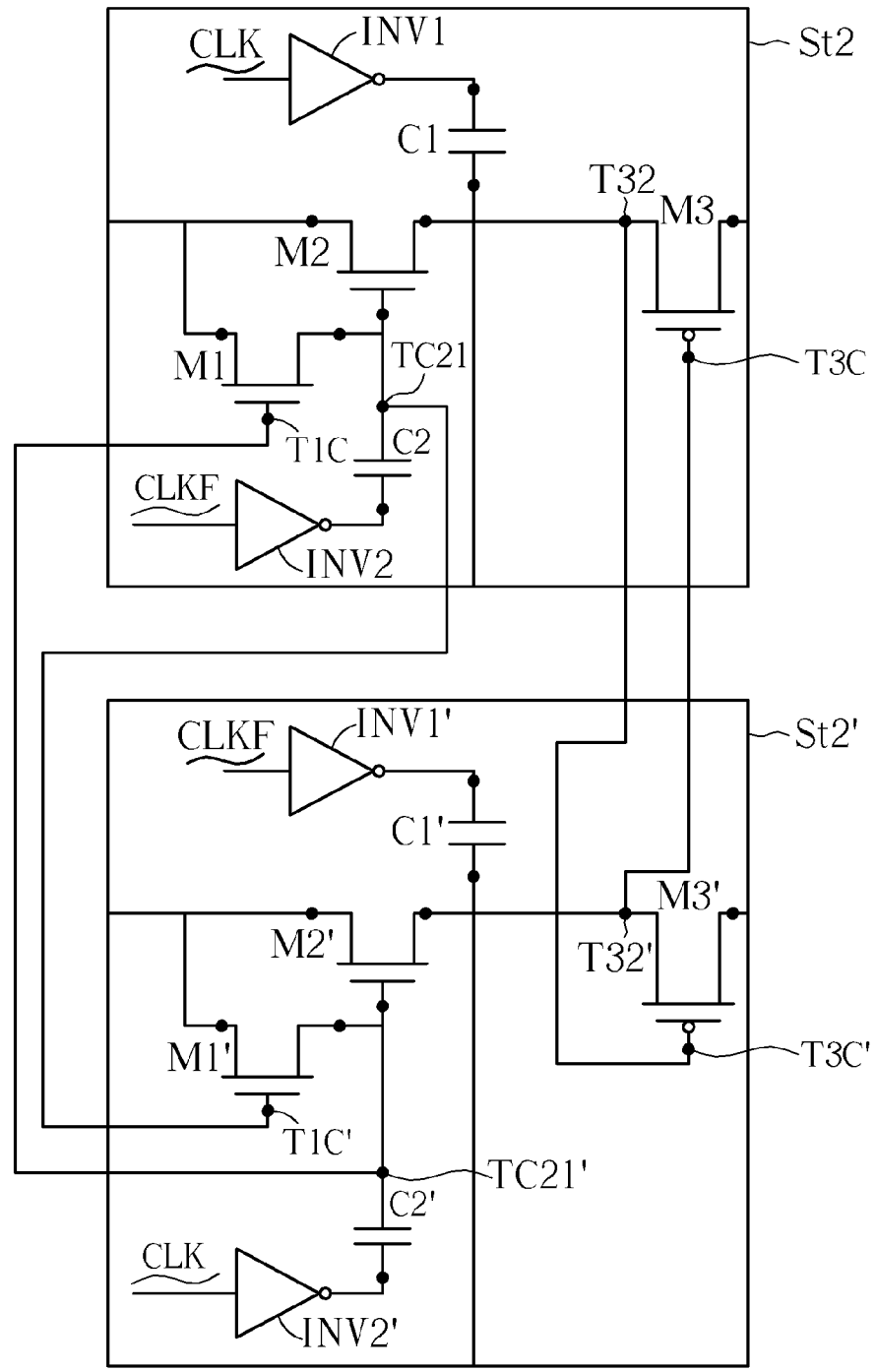
FIG. 2B is a circuit diagram illustrating one of the mechanisms for controlling the pumping stage shown in FIG. 2A.

The signals provided to the control terminal T1C of the first switch M1 and the control terminal T3C of the third switch M3 in the pumping stage St2 can be generated via various kinds of mechanisms. One of them is shown in FIG. 2B but does not mean to limit the scope of the present invention. Please note some symbols for the pumping stage St2 are omitted for brevity in FIG. 2B. As shown in FIG. 2B, the pumping stage St2 is coupled to another pumping stage St2'. The pumping stage St2' has the same devices and the same arrangement as which of the pumping stage St2. However, the pumping stage St2' operate in opposite phases.

Specifically, the inverter INV1' of the pumping stage St2', which corresponds to the inverter INV1 of the pumping stage St2, receives a clock signal CLKF having an inverted phase with which of the clock signal CLK received by the inverter INV1 of the pumping stage St2. Similarly, the inverter INV2 in the pumping stage St2 receives the clock signal CLKF, but the inverter INV2' in the pumping stage St2' receives the clock signal CLK.

The signal at the control terminal T1C of the first switch M1 of the pumping stage St2 equals to which at the first terminal TC21' of the capacitor C2' of the pumping stage St2'. Similarly, the signal at the control terminal T1C' of the first switch M1' of the pumping stage St2' equals to which at the first terminal TC21 of the capacitor C2 of the pumping stage St2. Besides, the signal at the control terminal T3C of the third switch M3 of the pumping stage St2 equals to which at the second terminal T32' of the third switch M3' of the pumping stage St2'. Similarly, the signal he signal at the control terminal T3C' of the third switch M3' of the pumping stage St2' equals to which at the second terminal T32 of the third switch M3 of the pumping stage St2.

Figure 3:
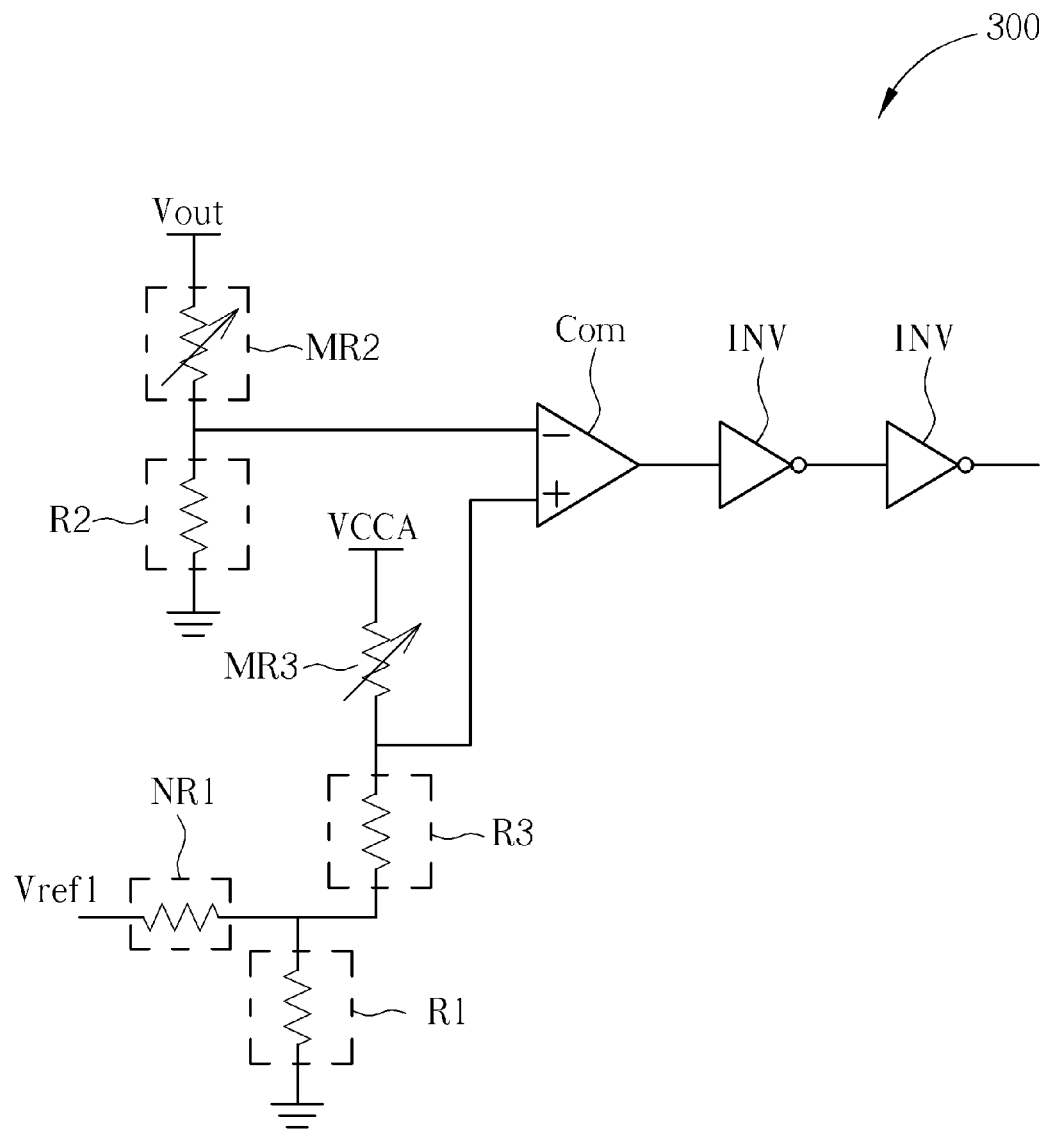
FIG. 3 is a circuit diagram indicating a prior art output voltage detecting circuit.

FIG. 3 is a circuit diagram indicating a prior art output voltage detecting circuit 300. The output voltage detecting circuit 300 compares the voltage generated from the output voltage Vout and the voltage generated from the reference voltage Vref1 to generate a detecting signal DS. Such that the output voltage can be adjusted to a desired value. As shown in FIG. 3, M and N are ratios of the resistors in FIG. 3. The value of R3 equals to the resistance formed by connecting the resistors R1 and R2 in parallel. The following equation Eq (1) can be acquired based on FIG. 3.

$$Vout=VCCA+Vref1*M/(N+1) \qquad Eq(1)$$

If M is set to 4, N is set to 1.05, and Vref1 is set to be 1.025, following equations will be acquired:

$$Vout=VCCA+Vref1*4/2.05=VCCA+1.95Vref1 \qquad Eq(2)$$

If Vref1 varies due to process related mismatch, the trim parameter M is adjusted to get the output voltage Vout back to the target. Besides, if different Vout-VCCA is desired, the trim parameter M is also adjusted. VCCA is DRAM array power, VCC for array.

Figure 4:
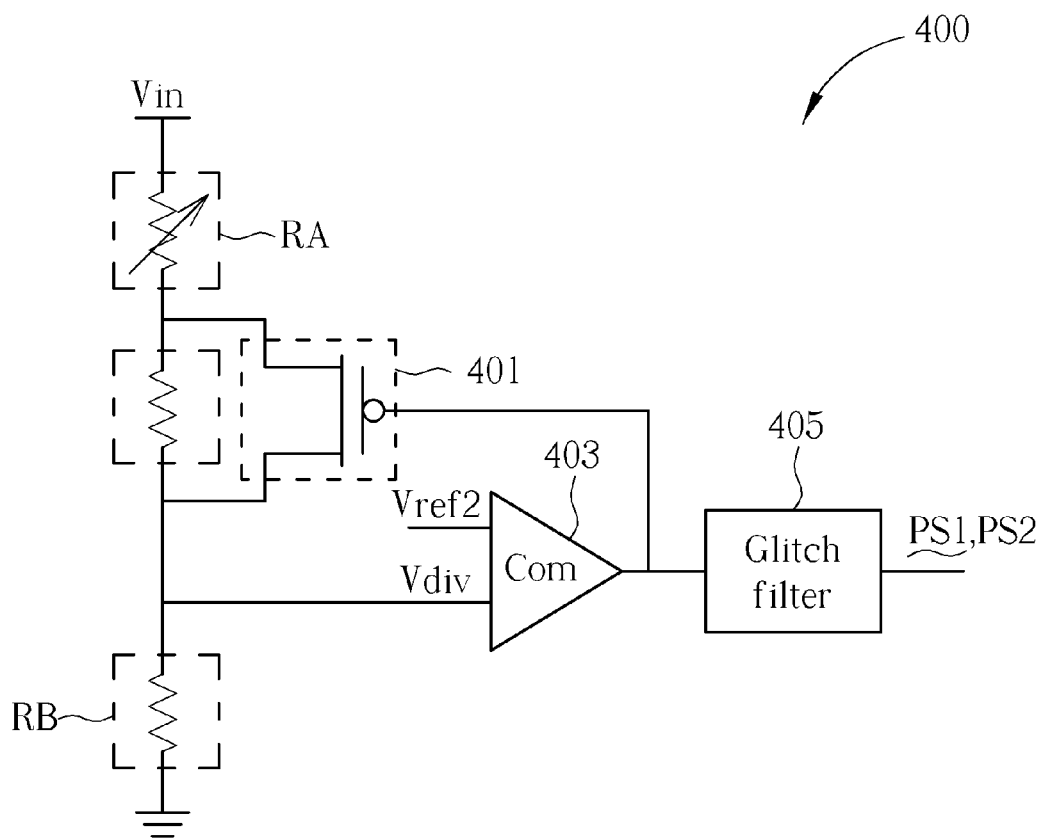
FIG. 4 is a circuit diagram illustrating a path selecting circuit according to one embodiment of the present invention.

FIG. 4 is a circuit diagram illustrating a path selecting circuit 400 according to one embodiment of the present invention. As shown in FIG. 4, the path selecting circuit 400 includes a comparator 403, a glitch filter 405, and resistors RA, RB. Besides, the path selecting circuit 400 further includes a hysteresis circuit 401, but not limited. AS shown in FIG. 4, the comparator 403 compares the reference voltage Vref2 and the division voltage Vdiv generated from the input voltage Vin, and thereby generates the path selecting signals PS1, PS2.

If reasonable pump capacity is desired, each stage drop needs to be less than 0.7 Vin.

Vin*0.7>(Vout-VCCA)/n, n indicates the number of pumping stages

In the embodiment of FIG. 2A, thus $$Vin*0.7>(Vout-VCCA)/2$$

Combined with Eq(1), get
Vin*0.7>Vref2*M/(N+1)/2 further
Vref2<1.4*Vin*(N+1)/M

As stated in the description of FIG. 3, N is set to 1.05 therefore $$Vref2<2.87*Vin/M \qquad Eq(3)$$

If the same trim parameters M are both utilized in the output voltage detecting circuit 300 shown in FIG. 3 and the path selecting circuit 400 in FIG. 4, the path selecting circuit 400 will be accurate since the trim parameter M thereof varies following the output voltage detecting circuit.

For more detail, the resistor RB in FIG. 4 is set to be 2.84*R4. R4 is a predetermined resistance value in this embodiment. The value 2.84 relates to the value of N in FIG. 3. Besides, the resistor RB in FIG. 4 is set to be (M−2.84)*R4, which relates both the values M and N in FIG. 3. Therefore, the value of RA+RB is MR4.

In this case, division voltage Vdiv equals to 2.87*Vin/M, the same as Eq(3).

In view of above-mentioned embodiments, pumping stages can be selected corresponding to different requirements. Besides, an accurate path selecting circuit varies trim parameter thereof corresponding to the trim parameter of the output voltage detecting circuit is also provided.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A voltage pumping circuit, for pumping an input voltage to generate an output voltage, comprising:
a first voltage pumping path including a first number of pumping stages;
a second voltage pumping path including a second number of pumping stages, wherein the second number is less than the first number;
wherein only one of the first voltage pumping path and the second voltage pumping path is activated according to at least one path selecting signal to pump the input voltage to generate the output voltage;
a first pumping stage;
a second pumping stage;
a third pumping stage; and
a pre-charge circuit coupled to the second pumping stage;
wherein the first pumping stage, the second pumping stage and the third pumping stage sequentially form the first voltage pumping path;
where the pre-charge circuit, part of the second pumping stage and the third pumping stage sequentially form the second voltage pumping path;
wherein the first pumping stage is not included in the second voltage pumping path;
wherein at least one of the first pumping stage, the second pumping stage and the third pumping stage includes:
a first switch, having a first terminal, a second terminal receiving the input voltage or output from a previous pumping stage, and having a control terminal;
a second switch, having a first terminal, having a control terminal coupled to the first terminal of the first switch, and having a second terminal coupled to the second terminal of the first switch;
a third switch, having a first terminal for outputting the output voltage or for outputting to the next pumping stage, and having a second terminal coupled to the first terminal of the second switch;
a first capacitor, having a first terminal, and having a second terminal coupled to the first terminal of the second switch;
a first inverter, having an output terminal coupled to the first terminal of the first capacitor;
a second capacitor, having a first terminal coupled to the control terminal of the second switch, and having a second terminal; and
a second inverter, for receiving the path selecting signal, having an output terminal coupled to the second terminal of the second capacitor.

2. The voltage pumping circuit of claim 1, further comprising:
an output voltage detecting circuit, for generating a detecting signal according to the output voltage and a first reference voltage such that the output voltage can be adjusted to a desired value, wherein the output voltage detecting circuit utilizes a first trim parameter to adjust the output voltage back to the desired value if the first reference voltage varies; and
a path selecting circuit, for comparing a division voltage generated from the input voltage and a second reference voltage to generate the path selecting signal, wherein the output voltage detecting circuit utilizes a second trim parameter to generate the division voltage;
wherein the first trim parameter and the second trim parameter have the same values.

3. A voltage pumping circuit, for pumping an input voltage to generate an output voltage, comprising:
a first voltage pumping path including a first number of pumping stages; and a second voltage pumping path including a second number of pumping stages, wherein the second number is less than the first number;

wherein only one of the first voltage pumping path and the second voltage pumping path is activated according to at least one path selecting signal to pump the input voltage to generate the output voltage;

wherein the pumping stage includes:

a first switch, having a first terminal, a second terminal receiving the input voltage or output from a previous pumping stage, and having a control terminal;

a second switch, having a first terminal, having a control terminal coupled to the first terminal of the first switch, and having a second terminal coupled to the second terminal of the first switch;

a third switch, having a first terminal for outputting the output voltage or for outputting to the next pumping stage, and having a second terminal coupled to the first terminal of the second switch;

a first capacitor, having a first terminal, and having a second terminal coupled to the first terminal of the second switch;

a first inverter, having an output terminal coupled to the first terminal of the first capacitor;

a second capacitor, having a first terminal coupled to the control terminal of the second switch, and having a second terminal; and a second inverter, for receiving the path selecting signal, having an output terminal coupled to the second terminal of the second capacitor.

4. A voltage pumping circuit, for pumping an input voltage to generate an output voltage, comprising:

a first voltage pumping path including a first number of pumping stages; and a second voltage pumping path including a second number of pumping stages, wherein the second number is less than the first number, wherein the first voltage pumping path and the second voltage pumping path share at least one device of a single pumping stage;

wherein only one of the first voltage pumping path and the second voltage pumping path is activated according to at least one path selecting signal to pump the input voltage to generate the output voltage;

wherein the voltage pumping circuit comprises a first pumping stage, a second pumping stage, a third pumping stage and a fourth pumping stage; where the first pumping stage, the second pumping stage and the third pumping stage sequentially form the first voltage pumping path; wherein the fourth pumping stage and the third pumping stage sequentially form the second voltage pumping path; where the second pumping stage and the fourth pumping stage share at least one device;

wherein the second pumping stage includes:

a first switch, having a first terminal, a second terminal receiving output from the first pumping stage, and having a control terminal;

a second switch, having a first terminal, having a control terminal coupled to the first terminal of the first switch, and having a second terminal coupled to the second terminal of the first switch; and a third switch, having a first terminal for outputting to the third pumping stage, and having a second terminal coupled to the first terminal of the second switch;

a first capacitor, having a first terminal, and having a second terminal coupled to the first terminal of the second switch;

a first inverter, having an output terminal coupled to the first terminal of the first capacitor;

a second capacitor, having a first terminal coupled to the control terminal of the second switch, and having a second terminal; and a second inverter, for receiving the path selecting signal, having an output terminal coupled to the second terminal of the second capacitor;

wherein the fourth pumping stage includes:

a fourth switch, having a first terminal, having a second terminal for receiving the input voltage, and having a control terminal;

a fifth switch, having a first terminal coupled to the second terminal of the third switch, having a control terminal coupled to the first terminal of the fourth switch, and having a second terminal coupled to the second terminal of the fourth switch;

the first inverter;

the third switch;

a third capacitor, having a first terminal coupled to the control terminal of the fifth switch, and having a second terminal; and a third inverter, for receiving the path selecting signal, having an output terminal coupled to the second terminal of the third capacitor.

* * * * *